Patented Jan. 24, 1950

2,495,456

UNITED STATES PATENT OFFICE 2,495,456

PURIFICATION OF MANGANESE SOLUTIONS

James H. Jacobs, Boulder City, Nev., assignor, by mesne assignments, to Crimora Research and Development Corporation, Crimora, Va., a corporation of Virginia No Drawing. Application November 13, 1944, Serial No. 563,324

4 Claims. (Cl. 204—105)

This invention relates, generally, to the purification of manganese solutions and it has particular relation to removing impurities therefrom preparatory to electrolysis for increasing the efficiency and yield.

It is well known that such solutions can be purified by treating them with sulfide ion in the form of hydrogen sulfide, ammonium sulfide, or other soluble sulfide. The sulfide ion causes the precipitation of impurities such as nickel, cobalt, and copper. The precipitated sulfides of these impurities are removed from the solution by filtration.

It has been suggested (Ambrose Patent No. 2,347,451) that more complete precipitation of these undesired metals with less loss of manganese can be obtained by adding finely divided material, such as infusorial earth, silica gel, activated charcoal, etc., and allowing the solution to stand for an appreciable length of time. In other words, a batch process is used. For the finely divided material, it has also been suggested (Wanamaker and Morgan Patent No. 2,325,723) that sludge from a previous precipitation may be employed.

The time required to effect the precipitation of the sulfides, as above described, is somewhat critical. If too little time is allowed, there is incomplete precipitation of the undesired metals and there is substantial loss of manganese. If too much time is allowed, there is re-solution of the sulfide precipitation, particularly copper sulfide. While the finely divided material, referred to hereinbefore, makes the time less critical, it increases the amount of sulfide consumed in the process, probably because of adsorption of the precipitating sulfide by the finely divided material. Accordingly, one object of this invention is to improve upon the prior art processes of purifying manganese solutions preparatory to electrolyzing them.

A further object of the invention is to provide for continuously purifying the manganese solution preparatory to electrolyzing it, thereby avoiding the loss of time and the varying results of the batch method.

Another important object of the invention is to continuously introduce a precipitating sulfide into the manganese solution in the absence of air, while the solution is being agitated or stirred.

Other objects of the invention will be apparent to those skilled in the art.

For a more complete understanding of the nature and scope of the invention, reference can be had to the following description and to the appended claims.

In accordance with the invention, a precipitating sulfide, such as hydrogen sulfide, ammonium sulfide, and barium sulfide, is added to the manganese solution, which is maintained under pressure and while it is being stirred. At the pH of precipitation, usually 5.0 to 7.5, the sulfide ion concentration, at equilibrium, will be determined by the pressure of the hydrogen sulfide over the solution. Therefore, the sulfide ion can be added as a gas or as a sulfide which will react with the hydrogen ion of the solution to form hydrogen sulfide. It is important to note that an increased concentration of sulfide ion at a given pH is brought about by carrying out the precipitation under a slight pressure of hydrogen sulfide and while the solution is being stirred under this pressure.

It is highly desirable that air should be absent from the atmosphere above the solution because the concentration of the sulfide ion in the solution is determined, not by the total pressure of such atmosphere, but by the partial pressure of the hydrogen sulfide in it. Furthermore, if air is stirred into the solution, it oxidizes the precipitate and inferior results are obtained.

When the precipitation is effected, as just described, there is no necessity for aging the solution, as in the batch method heretofore used, or for adding any finely divided material.

A decrease in manganese loss can be obtained by adding the previous precipitate at the time of the precipitation and stirring. However, this is not important, since the precipitates obtained by the use of the invention, contain an inconsequential amount of manganese.

A typical analysis of the manganese solution before and after sulfide purification, using hydrogen sulfide, as herein specified, is as follows:

|  | Mn | (NH$_4$)$_2$SO | Fe | Cu | Ni | Pb |
|---|---|---|---|---|---|---|
|  | g./l. | g./l. | g./l. | g./l. | g./l. | g./l. |
| Before sulfiding | 34.5 | 136.5 | .003 | .177 | .0014 | .00125 |
| After sulfiding | 34.2 | 136.5 | .002 | .0002 | .001 | .0005 |

As hereinbefore stated, the sulfide purification is carried out under pressure and in the absence of air. The pressure may vary from a few inches of water to about two atmospheres. It may exist above and be mixed with the solution. Alternatively, the sulfide containing gas, may be forced into the solution at a suitable depth to create the required pressure and the bubbles of gas under pressure broken up and mixed with the solution.

By way of example, hydrogen sulfide can be continuously introduced into the solution line or conduit, leading from the storage tank containing the manganese solution to be purified, to a suitable enclosed mixer. The pressure of the gas is then determined by the head in the receiving tank into which the mixer discharges. This may be the equivalent of from one to ten feet of water. The discharge from the mixer contains the precipitated particles of the black sulfides of copper, nickel, lead, and cobalt. They are separated out of the solution by a suitable filter press, thereby leaving the manganese solution substantially free from impurities and ready for electrolysis.

By way of another example, the solution containing manganese sulfate, ammonium sulfate and the heavy metal impurities, is passed through a tank which is closed to the atmosphere. Hydrogen sulfide gas may be introduced approximately four feet below the solution level. The bubbles of the gas are broken up and intimately mixed with the solution at or slightly above the point of introduction. The sulfides of the undesired metals are rapidly precipitated and are separated out when the solution passes through a filter press connected to the tank.

From the foregoing description, it will be seen that the improved method greatly reduces the tie-up of purification equipment required for batch treatment, as heretofore practiced. It also provides a continuous supply of electrolyte to a cell, which may be of the single compartment type, and makes it possible to employ a re-circulating circuit for the spent electrolyte, including continuous leaching and purification equipment, whereby the pH range is maintained. Continuous leaching equipment of the type wherein reduced ore is supplied and residue is discharged, is well known. Thus, the invention provides a continuous method which permits the effective use of a simple single compartment cell.

Since certain further changes can be made in the method and different steps can be followed without departing from the spirit and scope of this invention, it will be understood that all matter set forth in the foregoing description shall be interpreted as illustrative and not in a limiting sense.

What is claimed as new is:

1. That method of purifying a solution of manganese and ammonium salts containing traces of nickel, copper and cobalt, preparatory to electrolysis, which is characterized by continuously delivering the solution at a pH of from about 5 to 7.5 to a closed container in the absence of air; introducing sulfide ion into the solution under pressure and in an amount sufficient to precipitate not more than about one percent of the manganese present in the solution and sufficient to convert the nickel, copper and cobalt into their sulfides; subjecting the solution to stirring action to hasten the precipitation; and continuously withdrawing and simultaneously filtering the solution to remove the precipitate.

2. The method, as set forth in claim 1, wherein the sulfide ion is introduced into and mixed with the solution before it enters the container.

3. The method, as set forth in claim 1, wherein the pH of the solution is about 7.5, and wherein the sulfide ion is hydrogen sulfide, and wherein the hydrogen sulfide is introduced into the container below the solution level at a pressure equivalent to one foot to ten feet, water column.

4. That process of removing traces of nickel and cobalt from a manganese electrolyte consisting of manganese and ammonium sulphates containing these impurities, which is characterized by delivering the solution at a pH of about 7.5 to a closed container in the absence of air; introducing and intimately mixing sulfide ion with the solution in a small amount sufficient to precipitate substantially all of the nickel and cobalt present in the form of a black sulfide; and immediately withdrawing and simultaneously filtering the purified solution.

JAMES H. JACOBS.

REFERENCES CITED

The following references are of record in the file of this patent:

UNITED STATES PATENTS

| Number | Name | Date |
|---|---|---|
| 1,047,825 | McKetchnie | Dec. 17, 1912 |
| 1,793,906 | Christensen | Feb. 24, 1931 |
| 2,020,325 | Myren et al. | Nov. 12, 1935 |
| 2,325,723 | Wanamaker | Aug. 3, 1943 |
| 2,343,293 | Hannay et al. | Mar. 7, 1944 |
| 2,347,451 | Ambrose | Apr. 25, 1944 |
| 2,376,433 | Julien et al. | May 22, 1945 |
| 2,392,385 | Hunter | Jan. 8, 1946 |

FOREIGN PATENTS

| Number | Country | Date |
|---|---|---|
| 511,877 | Great Britain | Aug. 25, 1939 |

OTHER REFERENCES

Steel, vol. 105, pp. 42–45, Oct. 30, 1939.